(12) United States Patent
Rothschild

(10) Patent No.: US 10,558,333 B1
(45) Date of Patent: Feb. 11, 2020

(54) SYSTEM AND METHOD FOR PROVIDING NETWORK-BASED VIDEO MANIPULATION RESOURCES TO A CLIENT DEVICE

(71) Applicant: Cox Communications, Inc., Atlanta, GA (US)

(72) Inventor: Keith Alan Rothschild, Dunwoody, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 84 days.

(21) Appl. No.: 14/214,275

(22) Filed: Mar. 14, 2014

Related U.S. Application Data (60) Provisional application No. 61/789,103, filed on Mar. 15, 2013, provisional application No. 61/788,255, filed on Mar. 15, 2013, provisional application No. 61/788,494, filed on Mar. 15, 2013.

(51) Int. Cl.
| | |
|---|---|
| *G06F 3/0481* | (2013.01) |
| *G06F 3/0482* | (2013.01) |
| *H04N 21/472* | (2011.01) |
| *H04N 21/482* | (2011.01) |
| *G06F 3/0484* | (2013.01) |

(52) U.S. Cl.
CPC .................................. *G06F 3/0484* (2013.01)

(58) Field of Classification Search
None
See application file for complete search history.

(56) References Cited

U.S. PATENT DOCUMENTS

| | | | | |
|---|---|---|---|---|
| 5,978,043 | A * | 11/1999 | Blonstein | H04N 5/50 725/47 |
| 6,396,473 | B1 | 5/2002 | Callahan et al. | |
| 8,106,917 | B2 * | 1/2012 | Herrick | G09G 5/14 345/547 |
| 8,332,889 | B2 * | 12/2012 | Calzone | H04N 21/4755 725/103 |
| 8,599,219 | B2 | 12/2013 | Schechtman | |
| 9,800,828 | B1 | 10/2017 | Rothschild et al. | |

(Continued)

OTHER PUBLICATIONS

Office Action dated Feb. 4, 2015, in co-pending U.S. Appl. No. 14/214,384.

(Continued)

*Primary Examiner* — Nhat Huy T Nguyen
(74) *Attorney, Agent, or Firm* — Merchant & Gould (57) ABSTRACT

Network-based video manipulation resources to a client device is provided. A service provider may provide a guide experience that incorporates thumbnail videos as part of the navigation experience. "Personalized" mosaics and videotiles are provided as part of the guide such that the mosaic has an integrated look and feel. The guide experience may also include an optional guide-view as part of the navigation guide. Further, the guide experience may receive input from a user to personalize the mosaic for the user. Mosaics may be defined including a plurality of thumbnails which may be available for display on a client device. Per a request received to manipulate a thumbnail within the mosaic with a video, the selected video may be retrieved, manipulated and transcoded in accordance with the request. The thumbnail may then be updated with the selected video within the mosaic, and the mosaic may be transmitted to the client device.

19 Claims, 9 Drawing Sheets

(56) References Cited

U.S. PATENT DOCUMENTS

| | | |
|---|---|---|
| 2003/0218682 A1 | 11/2003 | Lim |
| 2005/0028203 A1 | 2/2005 | Kim |
| 2006/0064716 A1 | 3/2006 | Sull |
| 2007/0011702 A1 | 1/2007 | Vaysman |
| 2007/0061842 A1* | 3/2007 | Walter ............... H04N 5/44543 725/48 |
| 2007/0204297 A1 | 8/2007 | Gonzalez |
| 2007/0234388 A1 | 10/2007 | King |
| 2008/0066103 A1 | 3/2008 | Ellis |
| 2008/0152297 A1 | 6/2008 | Ubillos |
| 2008/0153487 A1* | 6/2008 | Martin .................... H04W 4/02 455/435.1 |
| 2009/0037966 A1 | 2/2009 | Rolls et al. |
| 2009/0083824 A1* | 3/2009 | McCarthy .......... H04N 5/44591 725/151 |
| 2010/0074341 A1 | 3/2010 | Wan |
| 2010/0115554 A1 | 5/2010 | Drouet et al. |
| 2010/0123732 A1 | 5/2010 | Jenks |
| 2010/0171881 A1* | 7/2010 | Castellan ........... H04N 5/44543 348/598 |
| 2011/0184950 A1 | 7/2011 | Skaff |
| 2011/0216243 A1 | 9/2011 | Sekiguchi |
| 2011/0314501 A1* | 12/2011 | Vaysman ............... H04N 21/84 725/41 |
| 2013/0036438 A1 | 2/2013 | Kutaragi |
| 2013/0207999 A1 | 8/2013 | Hagiwara |
| 2013/0272394 A1 | 10/2013 | Brockman |
| 2014/0269930 A1* | 9/2014 | Robinson ........... H04N 21/2365 375/240.24 |

OTHER PUBLICATIONS

U.S. Appl. No. 14/214,331, filed Mar. 14, 2014 entitled "Method for Pre-Rendering Video Thumbnails at Other Than Macroblock Boundaries".

U.S. Appl. No. 14/214,384, filed Mar. 14, 2014 entitled "Simultaneously Optimizing Transport Bandwidth and Client Device Performance".

Office Action dated Jul. 16, 2015 in U.S. Appl. No. 14/214,384; 18 pgs.

Office Action dated Dec. 4, 2015 in U.S. Appl. No. 14/214,331; 14 pgs.

Final Office Action dated Feb. 10, 2017 in U.S. Appl. No. 14/214,384; (20 pgs.).

Office Action dated Jan. 30, 2017 in U.S. Appl. No. 14/214,331; 12 pgs.

Notice of Allowance dated Jun. 16, 2017 in U.S. Appl. No. 14/214,331, 12 pgs.

Office Action dated Aug. 25, 2017 in U.S. Appl. No. 14/214,384, 26 pgs.

Final Office Action dated May 3, 2018 in U.S. Appl. No. 14/214,384; 11 pgs.

Notice of Allowance dated Sep. 12, 2018 in U.S. Appl. No. 14/214,384; 9 pgs.

* cited by examiner

SYSTEM AND METHOD FOR PROVIDING NETWORK-BASED VIDEO MANIPULATION RESOURCES TO A CLIENT DEVICE

CROSS-REFERENCE TO RELATED APPLICATIONS

The present application claims priority to U.S. Provisional Patent Application No. 61/789,103 titled "System and Method for Providing Network-Based Video Manipulation Resources to a Client Device" filed Mar. 15, 2013, and U.S. Provisional Patent Application No. 61/789,255 titled "Method for Pre-Rendering Video Thumbnails at Other Than Macroblock Boundaries" filed Mar. 15, 2013, and U.S. Provisional Patent Application No. 61/789,494 titled "Method for Simultaneously Optimizing Transport Bandwidth and Client Device Performance" filed Mar. 15, 2013, the disclosures of which are hereby incorporated by reference in their entireties.

BACKGROUND

Many television services providers offer "mosaic" channels. These mosaic channels display multiple thumbnails of video content all on one screen so that a user watching that particular mosaic, whether it be channel based or application, is able to see multiple content, and may be able to navigate to the individual thumbnails to listen to the audio related to that content. However, many of the mosaic channels available today are genre based and static. For example, today's mosaic channels may be defined at the market level with preset channels. The user or subscriber watching the mosaic channel may not interact with it except for navigation; they may not be able to do any customization.

Users may appreciate a personalized mosaic space where they may have the ability to customize the mosaic channels such that they may set their preferred linear channels or network content. This may provide them with a very personal experience with multiple video panes that they may use to watch content or for navigation purposes.

SUMMARY

Embodiments of the present invention solve the above and other problems by providing network-based video manipulation resources to a client device. According to embodiments, the service provider provides a guide experience that incorporates thumbnail videos as part of the navigation experience. Some embodiments may include "personalized" mosaics and video-tiles as part of the guide such that the mosaic has an integrated look and feel experience. The guide experience may also include an optional guide-view as part of the navigation guide. Further, the guide experience may receive input from a user to personalize the mosaic for the user. This provides a highly integrated offering that should flow for a user. According to an embodiment, a mosaic may be defined, including a plurality of thumbnails, which may be available for display on the client device. When a request is received to manipulate a thumbnail with a video within the mosaic, the selected video may be retrieved, manipulated and transcoded in accordance with the request. The thumbnail may be updated with the selected video within the mosaic, and the mosaic may then be transmitted onto the client device.

The details of one or more embodiments are set forth in the accompanying drawings and description set out below. Other features and advantages will be apparent from a reading of the following detail description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures.

DETAILED DESCRIPTION

As briefly described above, embodiments of the present invention are directed to providing network-based video manipulation resources to a client device. The network-based video manipulation resources may be utilized to receive input from a user to personalize a user's guide experience. For example, a set-top box 905 (illustrated and discussed below with reference to FIG. 9) utilizes an application that is configured to access a network resource, which has permission to access the video stream and manipulate the videos. The set-top box is able to receive and incorporate the manipulated videos into thumbnail videos, displayed in a mosaic guide that provides the navigation experience for the set-top box. Further, some embodiments may include "personalized" mosaics and videotiles as part of the guide such that the mosaic provides an integrated and personalized look and feel experience.

Figure 1:
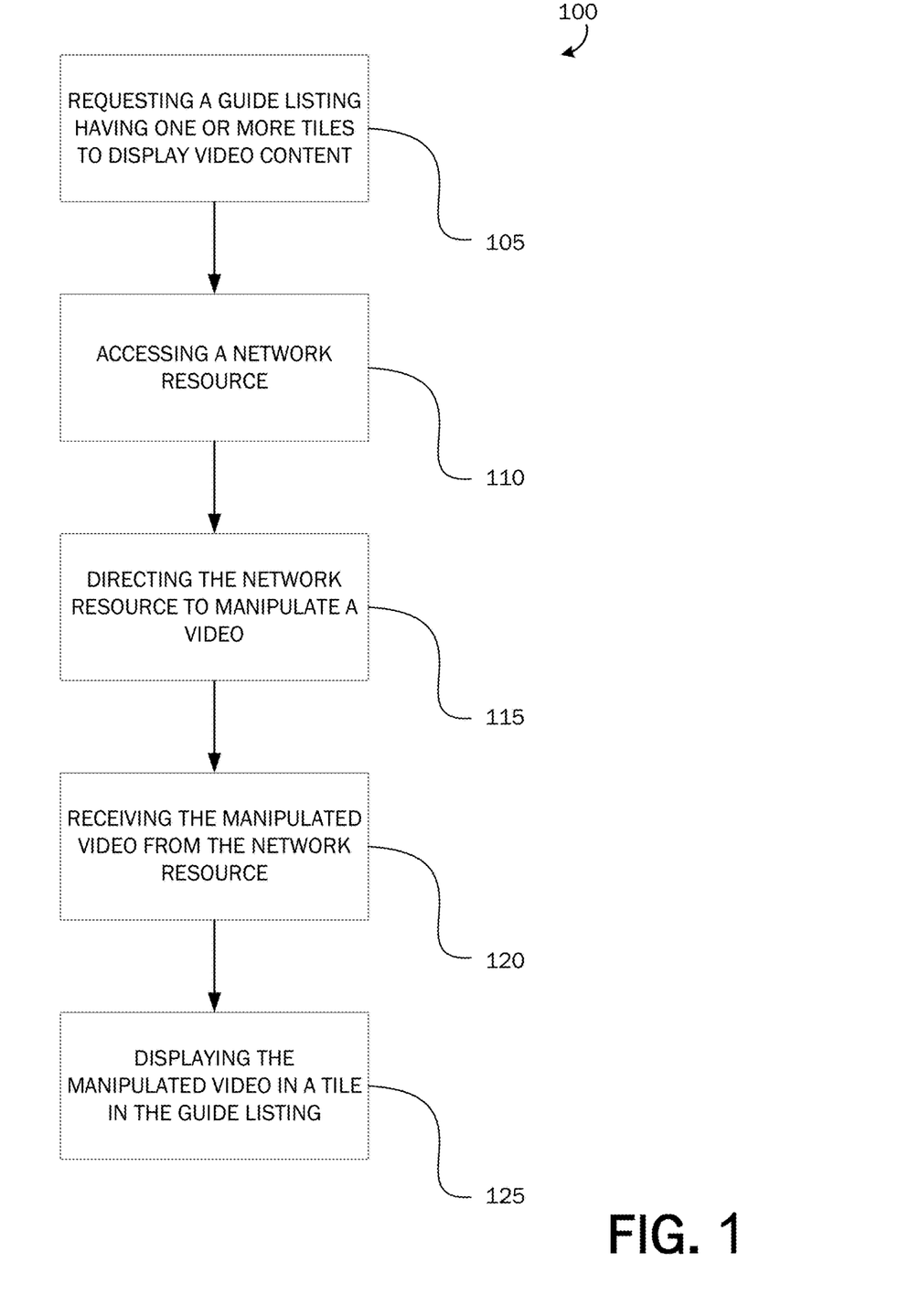
FIG. 1 is a flowchart illustrating one embodiment of a method for providing network-based video manipulation resources to a client device.
Figure 3:
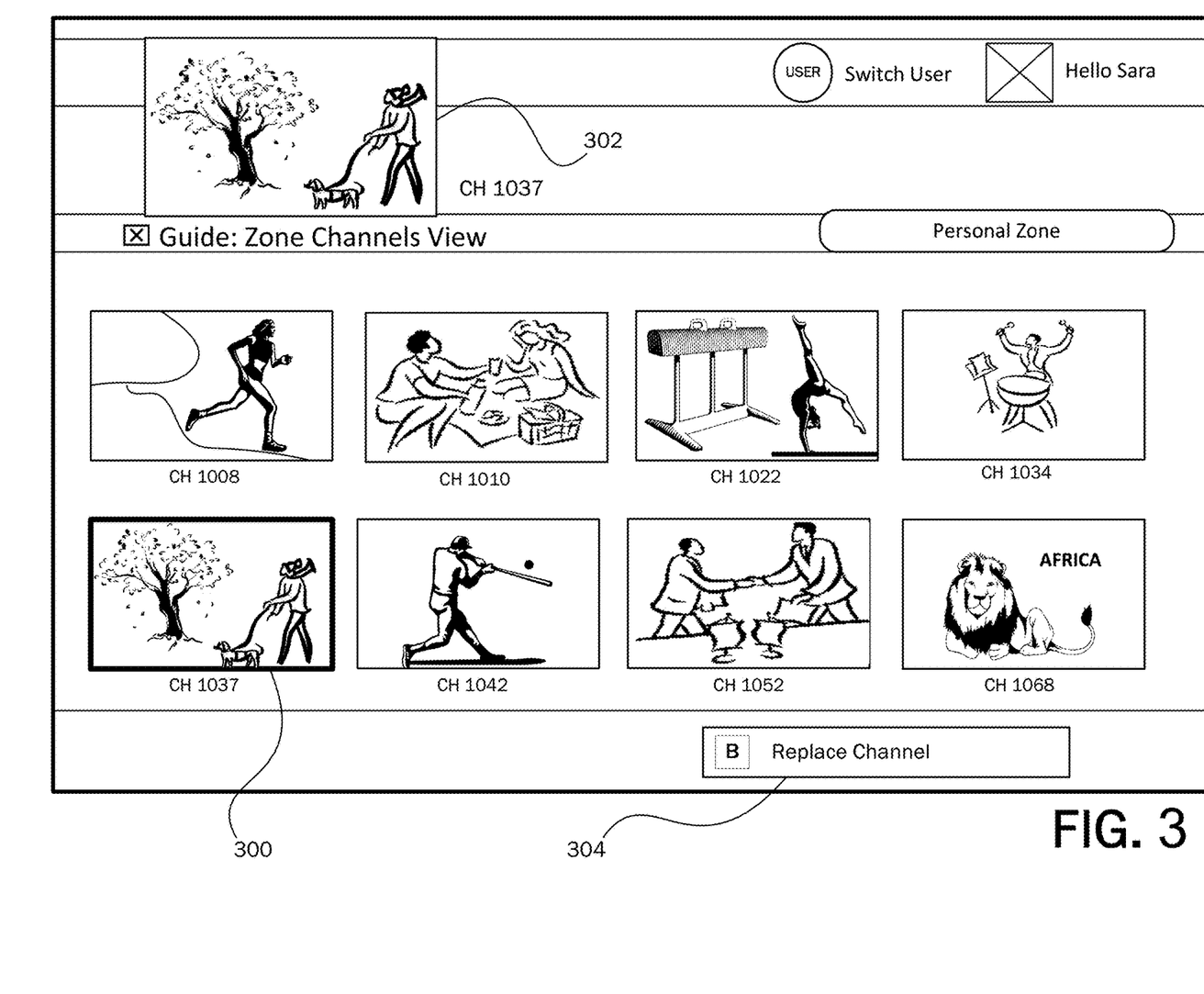
FIG. 3 is an example embodiment of a programming guide that incorporates thumbnail videos as part of the navigation experience.
Figure 4:
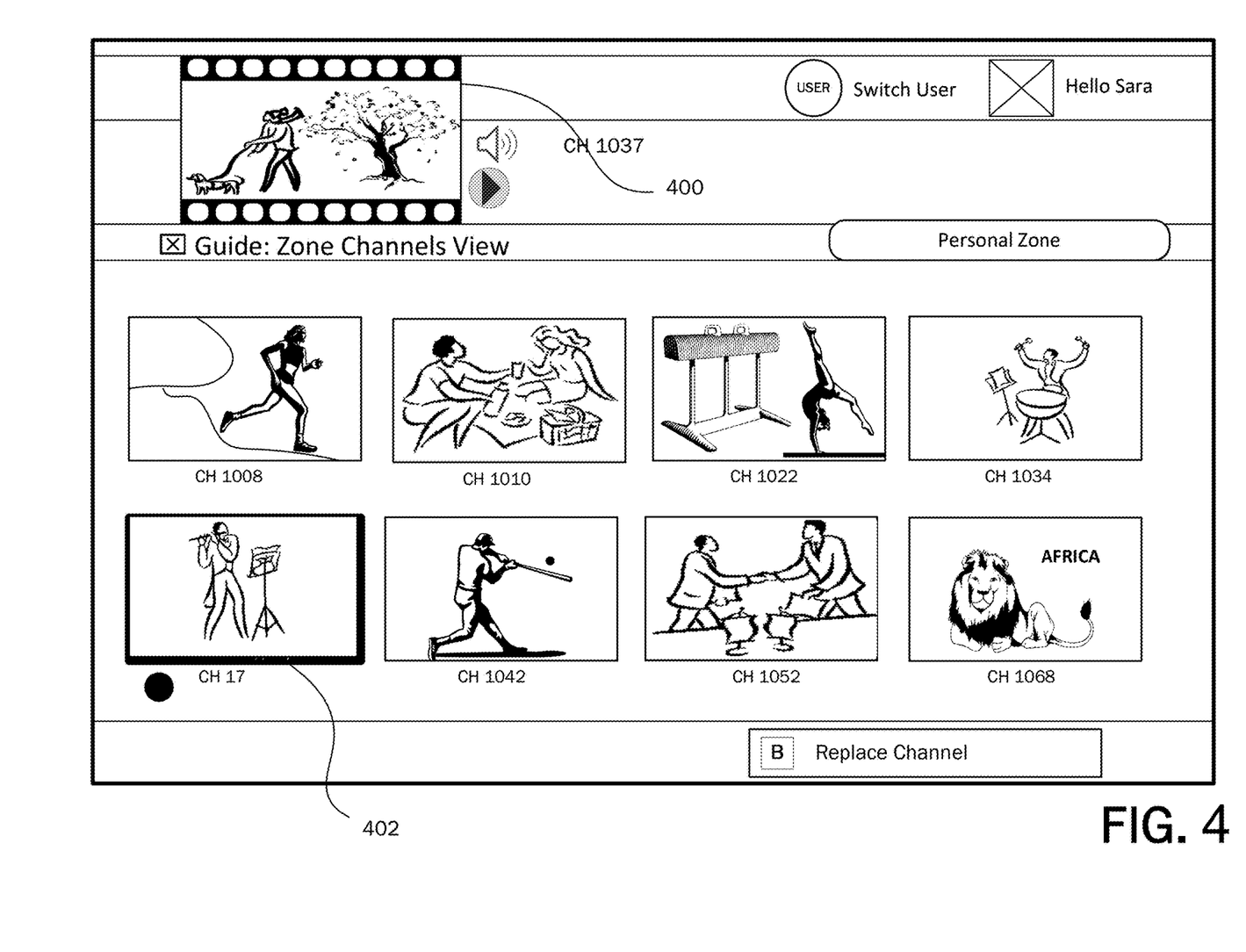
FIG. 4 is an example embodiment of a programming guide that incorporates thumbnail videos as part of the navigation experience.

FIG. 1 is flowchart illustrating one embodiment of a method 100 for providing network-based video manipulation resources to a client device. The method includes the operation 105 of requesting a guide listing having one or more tiles to display video content. One embodiment of the guide listing is illustrated in FIGS. 3 and 4.

At operation 110, the client device may access a network resource. For example, when the set-top box launches the guide, the set-top box may call the network resource to request a video stream with the following sources in the following locations.

At operation 115, the client device may direct the network resource to manipulate a video. In one embodiment, the set-top box 905 may direct the composition component to replace a video with another video. The set-top box may also indicate whether the video should include the active audio associated with the video. Further, the set-top box may tell the composition component to remove a video from the guide listing, to rearrange the remaining videos, and to add a new video at the end.

At operation 120, the client device may receive the manipulated video from the network resource. The composition component may determine that all of the resources are available to communicate with the set-top box 905 via the network. Specifically, the composition component may transmit the tiles and the transcoded video forms and it may put them in the locations that were identified by the set-top box. In one embodiment, the data stream may be transmitted to an IP based location that corresponds to the encryption and network resources that have been allocated; at which point the set-top box may receive the stream.

At operation 125, the client device may display the manipulated video in a tile on the guide listing.

Figure 2:
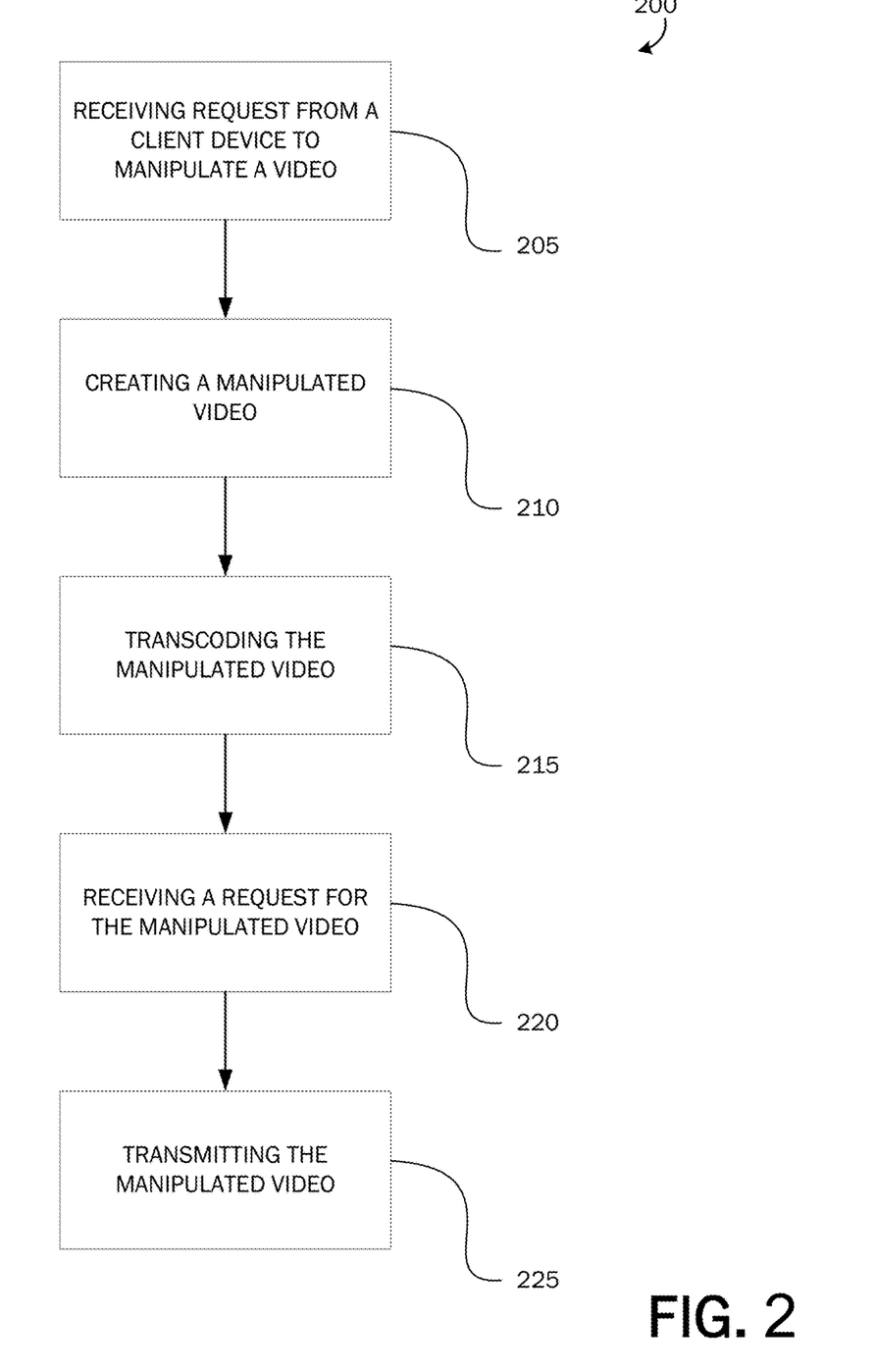
FIG. 2 is a flowchart illustrating one embodiment of a method for providing network-based video manipulation resources to a client device.

FIG. 2 is flowchart illustrating one embodiment of a method 200 for providing network-based video manipulation resources to a client device.

The method 200 includes the operation 205 of receiving a request from a client device to manipulate a video. In one embodiment, the set-top box 905 may essentially tell the composition component to replace a video with another video. In one embodiment, the set-top box may direct the composition component to replace a video with another video. The set-top box may also indicate whether the video should include the active audio associated with the video. Further, the set-top box can tell the composition component to remove a video from the guide listing, to rearrange the remaining videos, and to add a new video at the end.

At operation 210, the network resource may create a manipulated video.

At operation 215, the network resource may transcode the manipulated video. In one embodiment, all of the video streams may come into a transcoder. The transcoder may then transcode the video streams and communicate the video streams to the composition component to consume.

At operation 220, the network resource may receive a request for the manipulated video from the client device. In one embodiment, on the set top box side, when the set top box launches the guide, e.g., when the user switches to the guide view that displays videos, the set-top box may communicate to the network resource that a video stream with selected sources in the following locations is required.

At operation 225, the network resource may transmit the manipulated video to the client device. When the resources are available, the resources may be communicated to the set-top box via the network. This may occur concurrently or within a short time thereafter. For example, the network resource may go to the network to obtain the different tiles and the different transcoded video. The network resource may then put the transcoded videos in the identified locations and stream the data to an IP based location that corresponds to the encryption and network resources that it has been allocated at which point in time, the set top box will have tuned to the IP-based location. The set-top box may detect the steam, receive the steam, and may overlay all of the graphics on to the stream. In one embodiment, the identified locations for the steam may be a static set of coordinates. In another embodiment, the transcoded resource may be allocated to and located at a customized location. In one embodiment, the set-top box may display an animation during the back end processing. It should be noted that the embodiment may involve the integration of two different panes.

Further, the same process may be for the main video being displayed. For example, if the set-top box is displaying a live video, it may be displayed through one of the tiles of the mosaic. If the set-top box 905 switches views in the guide there may be several different options available. For example, the set-top box may display a scaled live video while displaying the listing guide. In another example, the set-top box may maintain the scaled live video and move the list view. In this situation, the list view may be moved, and upon channeling down, the set-top box may change the background to continue to display the video in the background as the guide is being displayed as a list instead of tiles.

The set-top box 905 may either go back to the way it would have been before the mosaics had been invoked, or the set-top box may keep the mosaics in the background and may switch back and keep the same screen by keeping the same pointer in the set location. In other words, if the set-top box 905 is two pages down in the list of recommendations, the set-top box may be able to retain its location in the list while seamlessly switching views.

FIG. 3 is an example embodiment of a programming guide that incorporates thumbnail videos as part of the navigation experience.

In the illustrated embodiment, the guide may be a mosaic including a plurality of tiles. Further, one of the tiles 300 in the mosaic may be selected such that the representation is displayed in the currently viewed tile 302. As depicted in FIG. 4, a video stream and audio may then be displayed in the currently viewed tile. The selected tile may also be replaced. For example, after selecting the tile, the user may be given the option 304 to replace the channel. For demonstrative purposes, the user may select to replace channel 1037 with channel 17.

FIG. 4 is an example embodiment of a programming guide that incorporates thumbnail videos as part of the navigation experience, which implements the actions of described above. Specifically, a video stream and audio may then be displayed in the currently viewed tile 400. Further, the bottom left tile 402 may be changed to reflect the content of another channel, for example, channel 17.

Figure 5:
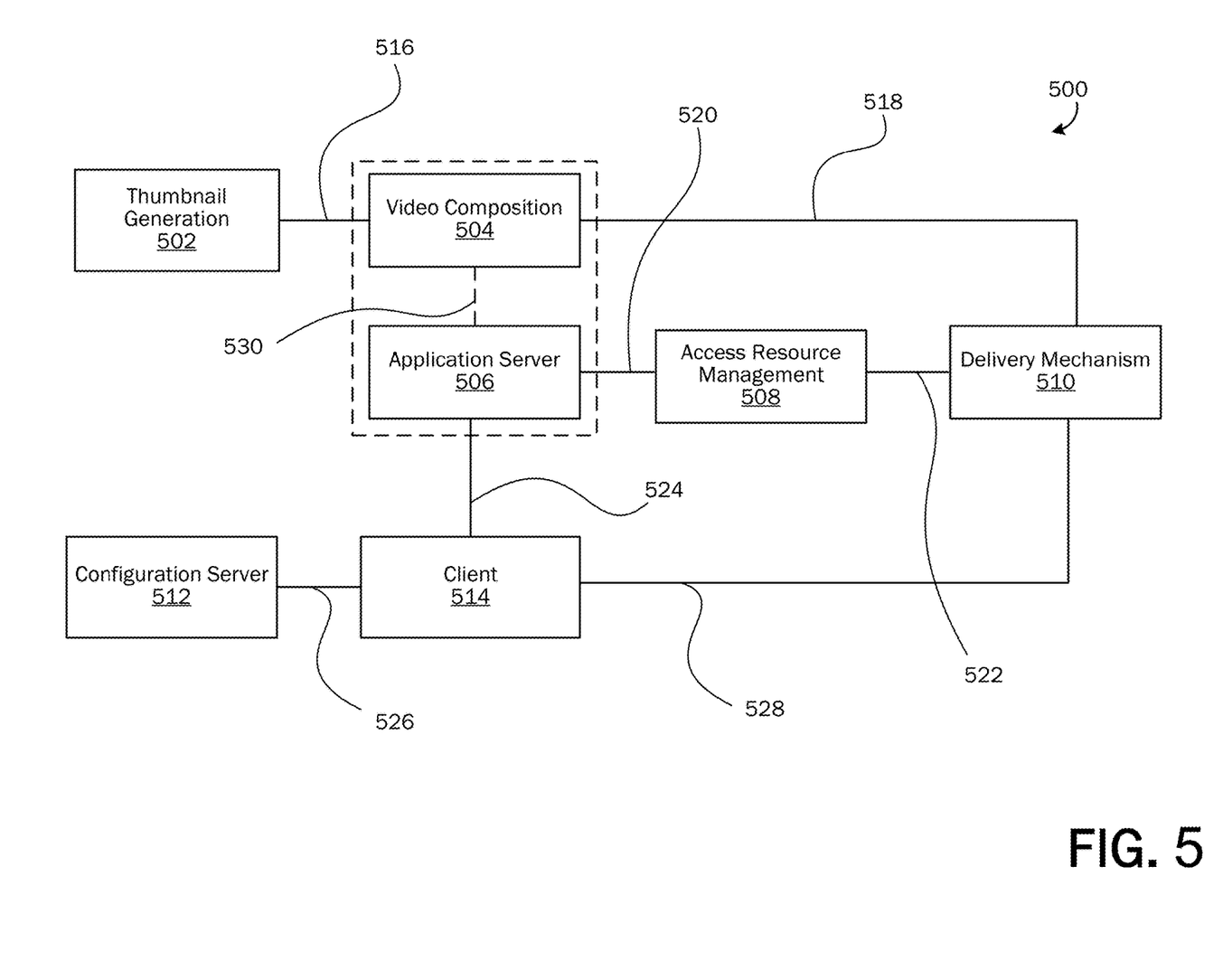
FIG. 5 is a block diagram of an exemplary system for providing network-based video manipulation resources to a client device.

FIG. 5 is a block diagram of an exemplary system 500 for providing network-based video manipulation resources to a client device. In the illustrated embodiment, the simplified block diagram is divided into multiple blocks, namely a thumbnail generation block 502, video composition block 504, application server block 506, access resource management block 508, delivery mechanism block 510, configuration server block 512, and the client block 514. It should also be noted that, in some embodiments, the video composition block 504 and application server block 506 may reside in the same system/component. Further, the simplified block diagram includes seven interfaces between the blocks, which allows for communication there between. Specifically, in the illustrated embodiment, the thumbnail generation block 502 and video composition block 504 communicate via a first interface 516, the video composition block 504 and delivery mechanism block 510 communicate via a second interface 518, the application server block 506 and access resource management block 508 communicate via a third interface 520, the access resource management block 508 and delivery mechanism block 510 communicate via a fourth interface 522, the application server block 506 and client block 514 communicate via a fifth interface 524, the delivery mechanism block 510 and access resource manager block 508 communicates via a seventh interface 528, the configuration server block 512 and client block 514 communicate via a sixth interface 526, and the video composition and application server communicate via an eighth interface 530. However, if the video composition block 504 and application server block 506 reside in the same system/component, as noted above, the seventh interface 528 may be a private interface if the blocks are implemented in a single component.

Generally, in one embodiment, the system operates to provide network-based video manipulation resources to a client device, wherein the video composition component may be an external resource managed by the client through the application server. The video composition may use reduced resolution versions of live feeds from the thumbnail generation component in the creation of tile-based video mosaics. The client interfaces with the configuration server block 512 for application configuration and option information. Composed video may be delivered to the client using the delivery mechanism block 510 as assigned by the access resource management 508 component.

Referring now to FIG. 5, the thumbnail generation block 502 is illustrated in association with the system for providing network-based video manipulation and includes hardware and software functionality operative to generate thumbnails of content provided by the service provider. For example, in one embodiment, the thumbnail generation block 502 may be a transcoder. As should be appreciated, the thumbnail generation block 502 also dictates characteristics relating to the thumbnail.

Generally, the target size of the thumbnails may be determined by the design of the user interface for the mosaic. For example, in one embodiment, the target size of the thumbnails may align with 16×16 macro-block boundaries consistent with MPEG-2/H.262 standards. In another example, the ability to support 8×8, 8×16, and 16×8 macroblock sizes for MPEG-4/H.264 standards may be provided.

However, neither 16×9 nor 4×3 thumbnails align well with 16×16 macro-block boundaries. Thumbnails of specific sizes are needed. However, in certain embodiments, the thumbnails may be generated within macro-block boundaries and rely on the application to block-out part of the macro-block and/or some of the video could be trimmed to fit better into the macro-block boundary. For example, the thumbnail video may be masked down from 16:12/4:3. In another embodiment, the thumbnail video may be trimmed down to 16:8/2:1.

The thumbnail generation block 502 and the video composition block 504 communicate via an interface. In one embodiment, the thumbnail generation and video composition component perform IP-based communication. For example, the thumbnails may be transmitted as live UDP-multicast streams and support IGMPv3 SSM. Furthermore, in one embodiment, the thumbnails may be MPEG-4 encoded and utilize a MPEG-2 transport stream encapsulation, and be scaled down to target resolutions. If the content is transmitted over the service provider's backbone, some level of conditional access or link-protection may be supported.

The video composition block 504 is illustrated in association with the system for providing network-based video manipulation. The video composition block 504 and may include hardware and software functionality operative to generate a live-streaming content stream containing multiple components. Further, the video composition block 504 may support standard-definition and high-definition outputs. For example, in one embodiment, the supported standard-definition and high-definition outputs include MPEG-2/H.262 and MPEG-4/H.264.

The video composition block 504 generates a live-streaming content stream for the graphics planes of the target devices. For example, in one embodiment, the video composition block 504 may be configured to generate the live-streaming content stream for square-resolution graphic planes, including 640×480 for standard-definition (40×30 macroblocks), 1280×720 (80×45 macro-blocks) and/or 1920×1080 for high-definition (120×67.5 macroblocks).

Further, the quality of the video may also be dependent upon the percentage of screen that can contain video at given bit-rates, inclusive of a single audio, encryption, and other overhead. Multiple constraints may be specified, including output resolution, GOP characteristics, and frame-rate. The cumulative bit-rates may include one or more of a range of values such as bit-rates of 2.50 Mbps, 3.75 Mbps, 5.00 Mbps, 6.25 Mbps, 7.50 Mbps, and so forth. Other considerations for selecting of the video quality may be influenced by implications to the shared HFC access resources being utilized, especially any considerations relating to the access-resource-management system selected.

The video composition generation block and the application server block 506 may communicate via an interface. As discussed above, the video composition block 504 and application server block 506 may reside in the same system/component that may be an internal interface, and may be proprietary to the vendor if the application server and video composition component are included in the same component.

The application server block 506 and the video composition block 504 may communicate via an interface. For example, the composed video may be transmitted to the delivery mechanism over UDP unicast or multicast as directed by the access resource manager. This video may be at the target resolution (full screen), and is intended to be MPEG-4 encoded over an MPEG-2 transport stream. Further, the PID structure may be compliant with the standards used for VOD SPTS streams.

The application server block 506 is illustrated in association with the system for providing network-based video manipulation. Generally, the application server is the session-manager and interfaces with the client (g), with the access resource manager (d), and with the video composition system (b). The application server block 506 and the access resource management block 508 may communicate via an interface. In one embodiment, the interface may leverage the open specifications used between the session manager and the resource manager. The application server block 506 and the client block 514 may communicate via another interface. In one embodiment, the client may be able to communicate instructions to the application server for the creation of the composite video, including all relevant information such as active audio, and may provide the client with tuning/content acquisition information.

The access resource management block 508 is illustrated in association with the system for providing network-based video manipulation and may include hardware and software functionality operative to manage access to the resources. In one embodiment, the session and resource management may be separated from one another. The access resource manager block and the delivery mechanism block 510 may communicate via an interface. Further, in some embodiments, it may be recognized that within a HFC access network, maintaining separate blocks of QAMs for different applications minimizes opportunities for efficiencies. For example, potential efficiencies may arise due to usage patterns between service groups with some potential for time-of-day based reconfiguration. Additional information relating to the access resource management block will be addressed, in more detail below, with respect to FIG. 6.

The delivery mechanism block 510 is illustrated in association with the system for providing network-based video manipulation and includes hardware and software functionality operative to transmit the video content. In one embodiment, the delivery mechanism block 510 is configured to provide encryption and QAM modulation. The thumbnail generation block 502 and the video composition block 504 may communicate via an interface. In one embodiment, the interface may leverage existing specifications on transmission of unicast streams to a client, such as those utilized within the VOD application space. In one embodiment, the delivery mechanism block 510 may closely resembles the VOD delivery mechanism.

However, some embodiments of the delivery mechanism block 510 may not have sufficient resources for transmission and, thus, may require additional resources. The sufficiency of the resources may vary from one operating-unit to another or even within any given operating-unit depending on unique characteristics. These additional resources may include selection of VOD QAMs over a dedicated bank of QAMs, sharing with SDV QAMs, or delivery in-band over DOCSIS. As should be appreciated, the distribution with SDV QAMs was considered as part of the evaluation of the access-resource manager segment, and is discussed below with respect to FIG. 6. Generally, distribution with SDV QAMs may provide separation of session and resource management interfaces in the Adrenalin 6.x platform, a session-based encryption workflow, and a distribution scheme alignment (VOD and Personalized Mosaics are QAM-unicast, SDV is QAM-multicast). With respect to delivery in-band over DOCSIS, the delivery mechanism block 510 may deliver to QAM-based IP-clients and set-top boxes with embedded DOCSIS capability.

The client block 514 is illustrated in association with the system for providing network-based video manipulation and may include hardware and software functionality operative to utilize personalized mosaics. Generally, the client may utilize the personalized mosaics as an external resource for manipulating streaming videos in a manner not capable within the client due to client-side limitations, e.g., processing, ability to receive, potential bandwidth constraints.

For example, the client may retrieve any configuration information from the configuration server block 512 and request the application server provide a frequency and MPEG-number where it can receive a video stream based on a set of specifications provided. The client may communicate information with the application server to select the included/active audio and/or to change content positioning or content. The client may render the graphics to ensure that transition graphics remain consistent and that the quality of graphics remains high while minimizing the bandwidth required for the live stream.

The configuration server block 512 and the client block 514 may communicate via an interface. In one embodiment, the interface may leverage existing interfaces where possible, including any in-flight modifications, and may minimize or eliminate project-specific modifications. For example, the client may need to know which services are available for inclusion as a video tile including entitlements, data to identify if a channel has a video tile available, and information about versions of the video tiles that are available.

The configuration server block 512 is illustrated in association with the system for providing network-based video manipulation and may include hardware and software functionality operative to provide customization options. In one embodiment, the configuration server block 512 may store and provide the client with customization information. For example, in one embodiment, mosaics may be generated using information that originates in the network, which may be provided to the client through the configuration server 512. In another embodiment, the customization information may include user defined customized mosaics that may be stored locally and on the configuration server 512. In either situation, users that utilize multiple types of devices may access their customized mosaics on any of their devices.

Figure 6:
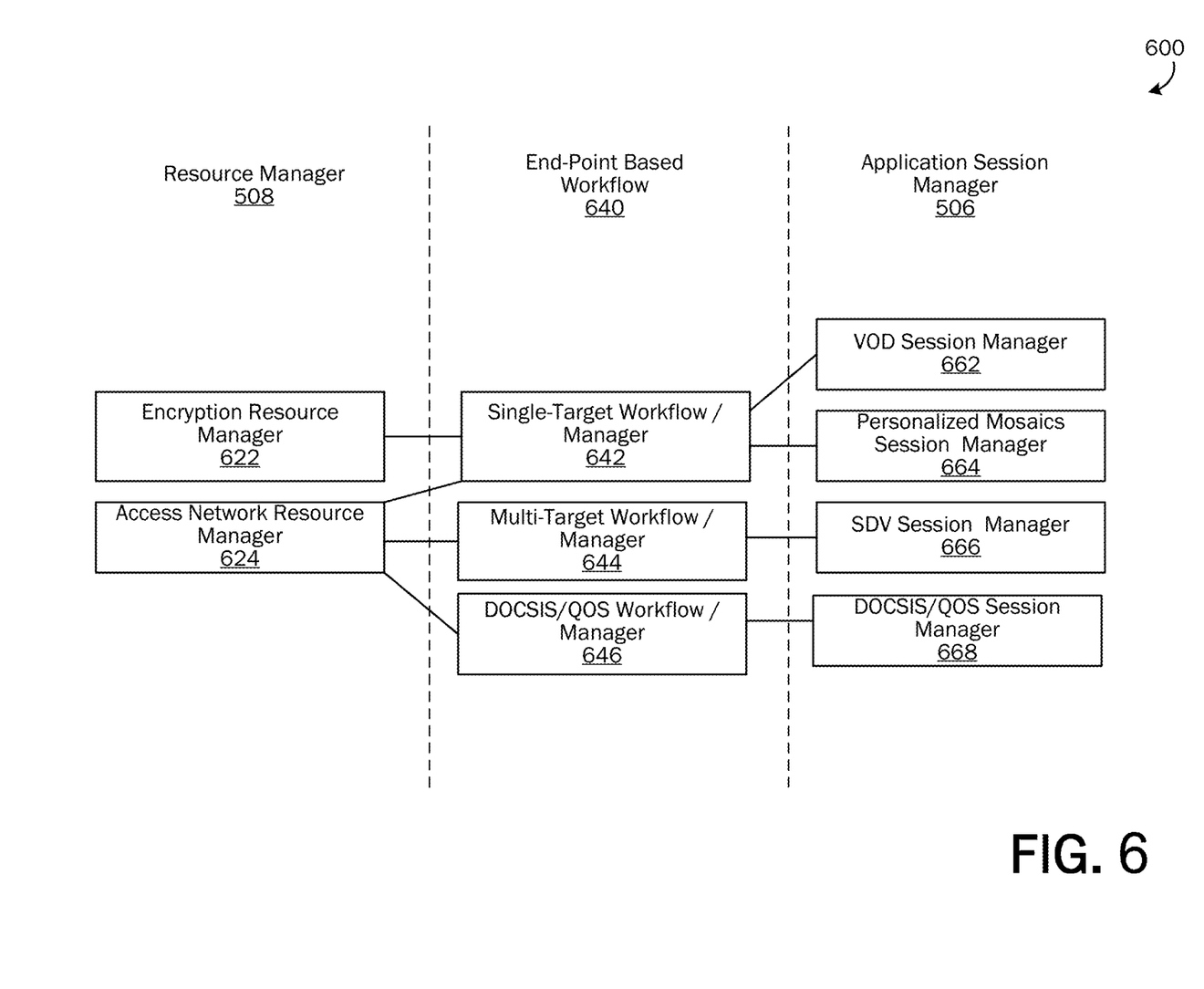
FIG. 6 illustrates a block diagram relating to the functionality and relationships between the resource manager and the application session manager.

FIG. 6 illustrates a block diagram 600 relating to the functionality and relationships between the resource manager 508 and the application session manager 506. Specifically, FIG. 6 illustrates one embodiment where the session and resource management may be separated from one another. Accordingly, the block diagram does not have a global access-network resource-manager component. Instead, the resource manager 508 may only have control over the dedicated pool identified for the application, including VOD and Personalized Mosaics. The resource manager 508 may fulfill more of the workflow aspect of the desired end-state, ensuring all the appropriate resources are allocated in an integrative manner (encryption and QAM/unicast) Furthermore, in order to implement encryption and access to the HFC access network (QAM/unicast), the personalized mosaics session manager is targeted to interface with the resource manager 508 to share encryption and HFC access network resources, and may be expected to do so in the same manner as the application session manager 506.

Generally, the diagram is separated into three types of categories, including a resource manager 508, an end-point based workflow 640, and an application session manager 506. The illustrated embodiment of the resource manager includes an encryption resource manager 622 and an access network resource manager 624. Further, the resource managers have been identified within SDV session manager and VOD session manager. In one embodiment, the resource manager 508 may include a Switched Digital Video (SDV) that typically relies on bulk network-encryption of content and manages multiple recipients of the same content (QAM/multicast), a Video On-Demand that typically relies on session-based encryption controlled by the resource manager 508 and manages content that is targeted to a single recipient (QAM/unicast), or other resource manager. The illustrated embodiment of the end-point based workflow 640 may include a single-target workflow/manager 642, a multi-target workflow/manager 644, and a DOCSIS/QOS workflow/manager 646. The illustrated embodiment of the application session manager includes a VOD session manager 662, a personalized mosaics session manager 664, an SDV session manager 666, and a DOCSIS/QOS session manager 668.

It should also be recognized that other configurations and embodiments may be utilized for the resource management function, the work-flow and integrated with resource-specific managers with a broader range of control over a specific resource class.

Figure 7:
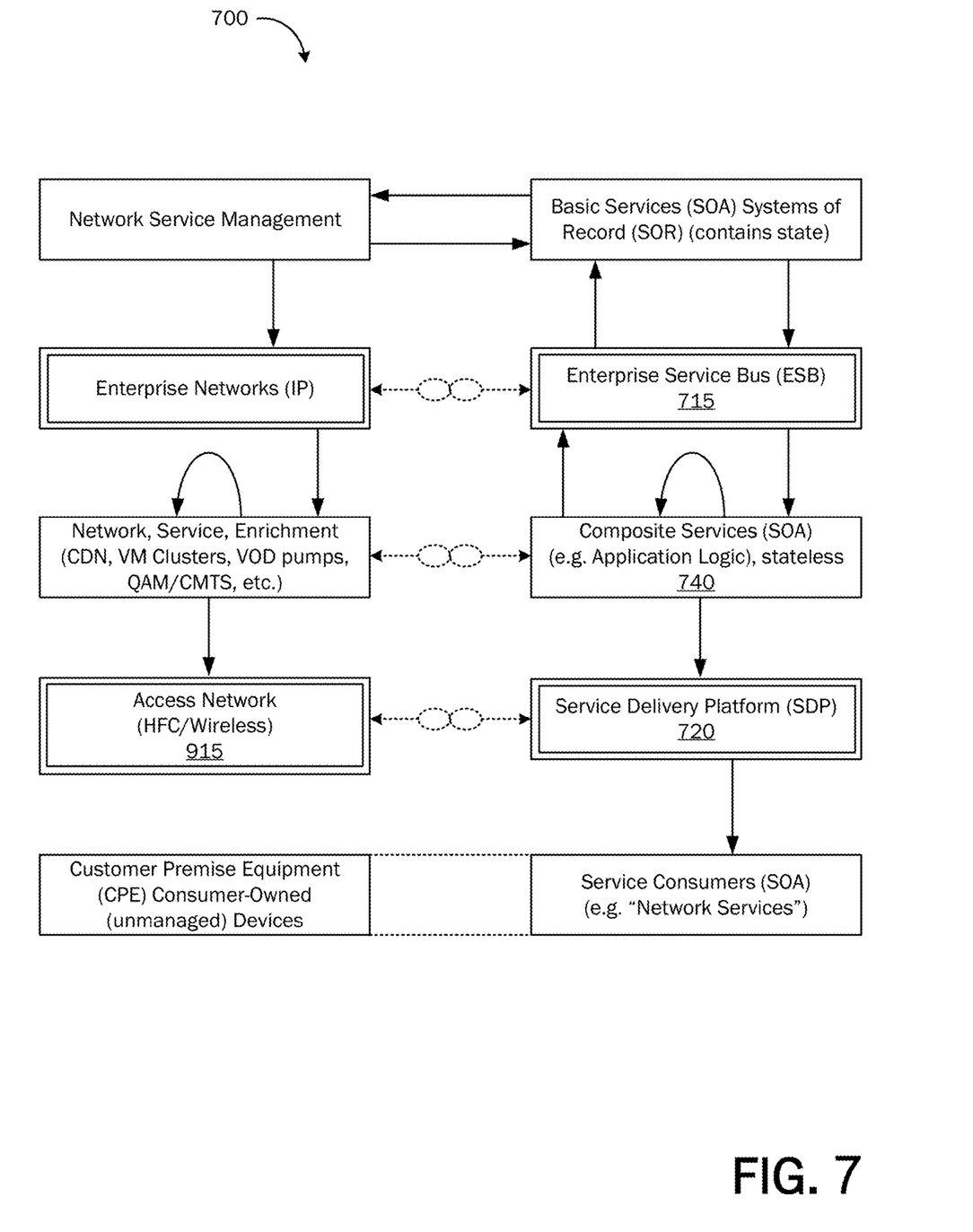
FIGS. 7 and 8 illustrate example architecture for a system providing network-based video manipulation resources to a client device.
Figure 8:
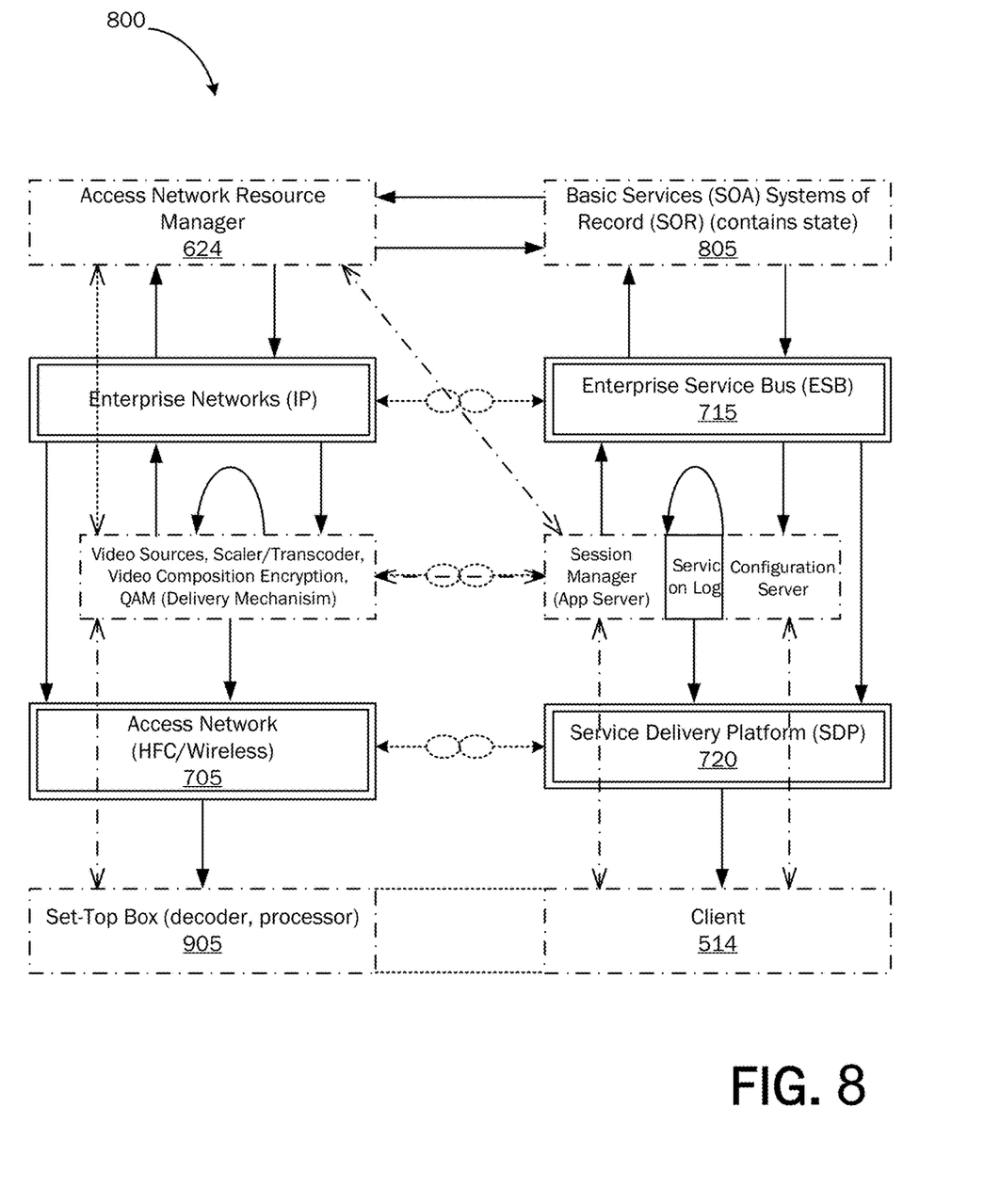

FIGS. 7 and 8 illustrate example architecture 700, 800 for a system providing network-based video manipulation resources to a client device. Specifically, FIG. 7 depicts a system architecture that may have components realigned to provide the architecture functionality as displayed in FIG. 8.

The redesign and coupling of architectural components is broadly recognized as being problematic as it may have complicated development and slowed deployment of new products and features. Accordingly, the system architecture illustrated in FIG. 8 may create an integrated platform by utilizing the existing components illustrated in FIG. 7 to create component segments that may be developed and deployed in parallel with few critical interdependencies.

In the illustrated embodiment, the service delivery platform (SDP) 720 and enterprise service bus (ESB) 715 are integration platforms that include a set of functionality that are core to a well-defined, critical to ensuring the integration function, and standard across a broad range of applications. The SDP 720 acts as an integration point separating the service provider's trusted network and an untrusted network. Further, some embodiments of SDP 720 may be mostly SOA-compliant. In addition to the SDP 720, the Enterprise Service Bus (ESB) 715 may also act as an integration component. For example, the ESB 715 may provide some of the same functions as the SDP 720, especially those related to integration functionality (e.g. abstraction/normalization). In one embodiment, the northbound-interface of the ESB 715 may generally maintain state while the southbound-interface may ideally be stateless (or maintain ephemeral states). Everything southbound of the ESB 715 in the application service stack may be expected to utilize a representational state transfer (RESTful) interface similar to most web-service interfaces. The ESB 715 may provide the interfaces for service that do not natively supply such an interface. The ESB 715 may also provide an interface to access data-stores (databases, flat-files, proprietary storage), basic services (SOA), or systems of record (SOR) 805. The ESB 715 may be used to abstract interfaces into these systems for consumption by composite services 740.

Figure 9:
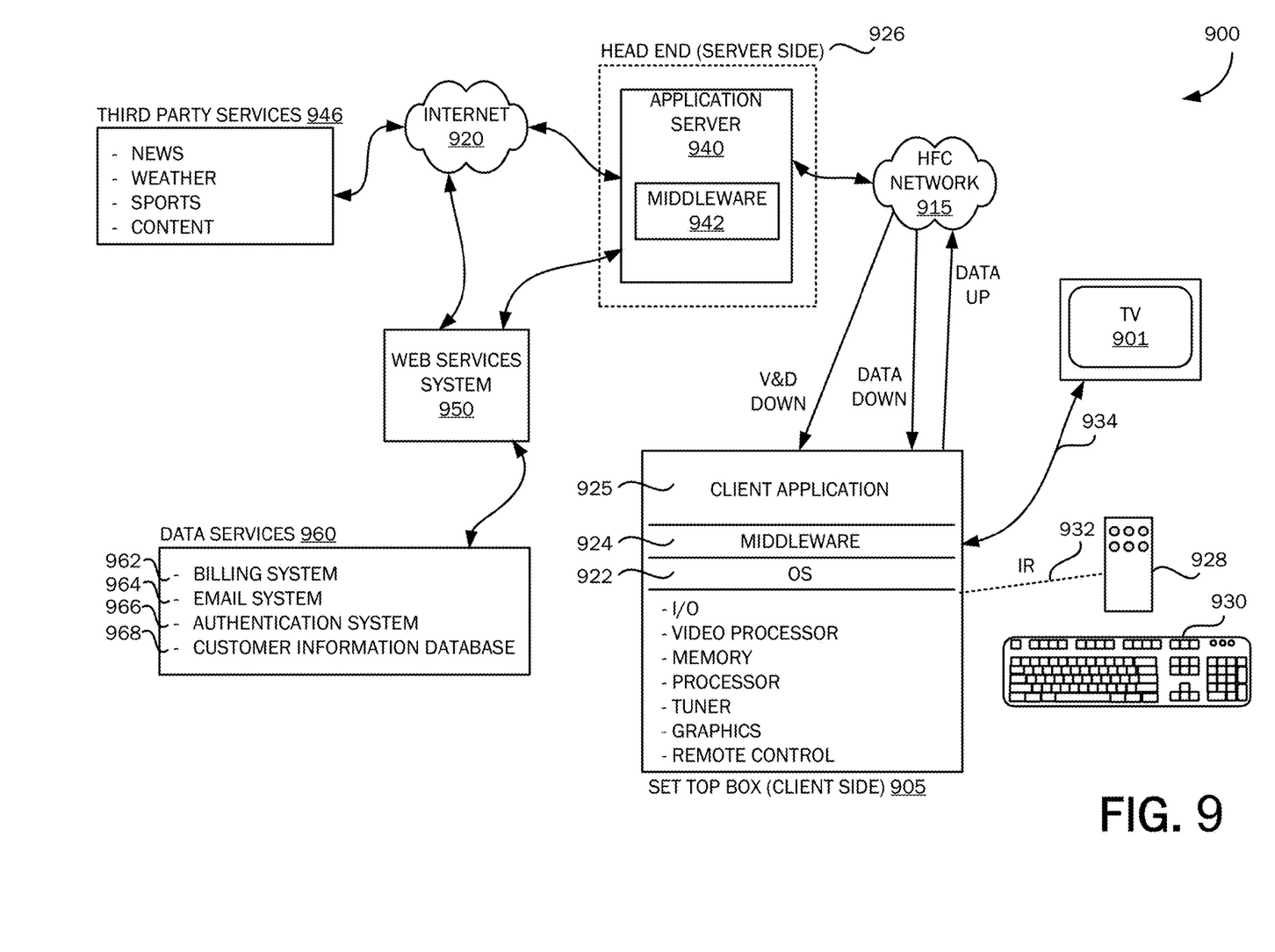
FIG. 9 is a simplified block diagram illustrating a cable television services system architecture providing an operating environment according to an embodiment.

FIG. 9 is a simplified block diagram illustrating a cable television services system 900 (hereafter referred to as "CATV") architecture providing an operating environment according to an embodiment. As can be appreciated, a CATV architecture is but one of various types of systems that may be utilized to provide recording of network-related content. For example, other systems such as satellite-based television services systems may be utilized for providing interaction between a customer/subscriber and third party content as set out above. Referring now to FIG. 9, digital and analog video programming, information content and interactive television services are provided via a hybrid fiber coax (HFC) network 915 to a television set 901 for consumption by a cable television/services system customer. As is known to those skilled in the art, HFC networks 915 combine both optical fiber and coaxial cable lines. Typically, optical fiber runs from the cable head end 926 to neighborhoods of subscribers. Coaxial cable runs from the optical fiber feeders to each customer or subscriber. The functionality of the HFC network 915 allows for efficient bidirectional data flow between the client-side set-top box 905 and a server-side application server 940 (also referred to as back end application server).

The CATV system 900 is in the form of a distributed client-server computing system for providing video and data flow across the HFC network 915 between server-side services providers (e.g., cable television/services providers) via a server-side head end 926 and a client-side customer via a client-side set-top box (STB) 905 functionally connected to a customer receiving device, such as the television set 901. As is understood by those skilled in the art, modern CATV systems 900 may provide a variety of services across the HFC network 915 including traditional digital and analog video programming, telephone services, high speed Internet access, video-on-demand, and information services.

On the client side of the CATV system 900, digital and analog video programming and digital and analog data are provided to the customer television set 901 via the set-top box (STB) 905. Interactive television services that allow a customer to input data to the CATV system 900 likewise are provided by the STB 905. As illustrated in FIG. 9, the STB 905 is a multipurpose computing device having a computer processor, memory, and an input/output mechanism. The input/output mechanism receives input from server-side processes via the HFC network 915 and from customers via input devices such as the remote control device 928, keyboard 930, or other computing device, such as a tablet/slate computer, smart phone, etc. The remote control device 928 and the keyboard 930 may communicate with the STB 905 via a suitable communication transport such as the infrared connection 932. The STB 905 also includes a video processor for processing and providing digital and analog video signaling to the television set 901 via a cable communication transport 934. A multi-channel tuner is provided for processing video and data to and from the STB 905 and the server-side head end system 926, described below.

The STB 905 also includes an operating system 922 for directing the functions of the STB 905 in conjunction with a variety of client applications 925. For example, if a client application 925 requires a news flash from a third-party news source to be displayed on the television 901, the operating system 922 may cause the graphics functionality and video processor of the STB 905, for example, to output the news flash to the television 901 at the direction of the client application 925 responsible for displaying news items. According to embodiments, the client applications 925 may include one or more applications suitable for coordinating third party content items to the television 901 and for locally storing third party content to a DVR storage capacity at the STB 905 in accordance with embodiments described above.

Because a variety of different operating systems 922 may be utilized by a variety of different brands and types of set-top boxes, a middleware layer 924 may be provided to allow a given software application to be executed by a variety of different operating systems. According to an embodiment, the middleware layer 924 may include a set of application programming interfaces (APIs) that are exposed to client applications 925 and operating systems 922 that allow the client applications to communicate with the operating systems through common data calls understood via the API set. As described below, a corresponding middleware layer is included on the server side of the CATV system 900 for facilitating communication between the server-side application server and the client-side STB 905. The middleware layer 942 of the server-side application server and the middleware layer 924 of the client-side STB 905 may format data passed between the client side and server side according to the Extensible Markup Language (XML).

According to one embodiment, the set-top box 905 passes digital and analog video and data signaling to the television 901 via a one-way communication transport 934. According to other embodiments, two-way communication transports may be utilized, for example, via high definition multimedia (HDMI) ports. The STB 905 may receive video and data from the server side of the CATV system 900 via the HFC network 915 through a video/data downlink and data via a data downlink. The STB 905 may transmit data from the client side of the CATV system 900 to the server side of the CATV system 900 via the HFC network 915 via one data uplink. The video/data downlink is an "in band" downlink that allows for digital and analog video and data signaling from the server side of the CATV system 900 through the HFC network 915 to the set-top box 905 for use by the STB 905 and for distribution to the television set 901. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 9, between the HFC network 915 and the set-top box 905 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 905 and the server-side application server 940 is typically passed through the "out of band" data links. Alternatively, an "in band" data carousel may be positioned in an "in band" channel into which a data feed may be processed from the server-side application server 940 through the HFC network 915 to the client-side STB 905. Operation of data transport between components of the CATV system 900, described with reference to FIG. 9, is well known to those skilled in the art.

Referring still to FIG. 9, the head end (also referred to as the back end) of the CATV system 900 is positioned on the server side of the CATV system and includes hardware and software systems responsible for originating and managing content for distributing through the HFC network 915 to client-side STBs 905 for presentation to customers via televisions 901. As described above, a number of services may be provided by the CATV system 900, including digital and analog video programming, interactive television services, telephone services, video-on-demand services, targeted advertising, and provision of information content.

The application server 940 is a general-purpose computing system operative to assemble and manage data sent to and received from the client-side set-top box 905 via the HFC network 915. As described above with reference to the set-top box 905, the application server 940 includes a middleware layer 942 for processing and preparing data from the head end of the CATV system 900 for receipt and use by the client-side set-top box 905. For example, the application server 940 via the middleware layer 942 may obtain data from third-party services 946 via the Internet 920 for transmitting to a customer through the HFC network 915 and the set-top box 905. For example, content metadata a third-party content provider service may be downloaded by the application server via the Internet 920. When the application server 940 receives the downloaded content metadata, the middleware layer 942 may be utilized to format the content metadata for receipt and use by the set-top box 905. Therefore, content metadata may be sent and categorized based on the availability to the customer's program guide data.

According to one embodiment, data obtained and managed by the middleware layer 942 of the application server 940 is formatted according to the Extensible Markup Language and is passed to the set-top box 905 through the HFC network 915 where the XML-formatted data may be utilized by a client application 925 in concert with the middleware layer 924, as described above. As should be appreciated by those skilled in the art, a variety of third-party services data, including news data, weather data, sports data and other information content may be obtained by the application server 940 via distributed computing environments such as the Internet 920 for provision to customers via the HFC network 915 and the set-top box 905.

According to embodiments, the application server 940 obtains customer support services data, including billing data, information on customer work order status, answers to frequently asked questions, services provider contact information, and the like from data services 960 for provision to the customer via an interactive television session. As illustrated in FIG. 9, the services provider data services 960 include a number of services operated by the services provider of the CATV system 900 which may include data on a given customer.

A billing system 962 may include information such as a customer's name, street address, business identification number, Social Security number, credit history, and information regarding services and products subscribed to by the customer. According to embodiments, the billing system 962 may also include billing data for services and products subscribed to by the customer for bill processing, billing presentment and payment receipt.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. According to an embodiment, the customer information database 968 may also include profile information for customers/subscribers that include permissions and authentication information associated with or required for accessing and recording third party content as set out above. As should be understood, this information may be stored in a variety of disparate databases operated by the cable services provider.

Referring still to FIG. 9, web services system 950 is illustrated between the application server 940 and the data services 960. According to embodiments, web services system 950 serves as a collection point for data requested from each of the disparate data services systems comprising the data services 960. According to embodiments, when the application server 940 requires customer services data from one or more of the data services 960, the application server 940 passes a data query to the web services system 950. The web services system formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above.

An authentication system 966 may include information such as secure user names, subscriber profiles, subscriber IDs, and passwords utilized by customers for access to network services. As should be understood by those skilled in the art, the disparate systems 962, 964, 966, 968 may be integrated or provided in any combination of separate systems, wherein FIG. 9 shows only one example.

Although described herein in combination with various computing devices, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-9. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

I claim:

1. A method for providing network-based video manipulation resources to a client device, comprising:
   providing a programming guide comprising a mosaic, the mosaic including a plurality of thumbnails displayed on the client device, wherein each of the plurality of thumbnails displays video at a particular location in the mosaic;
   receiving a selection of a first thumbnail from among the plurality of thumbnails, the first thumbnail displaying a first video at a first location in the mosaic;
   in response to receiving the selection of the first thumbnail, displaying the first thumbnail at a second location as a currently viewed thumbnail of the mosaic on the client device while maintaining the first thumbnail at the first location;
   in response to receiving a request from the client device to manipulate a selected video to replace the first video, access a network resource having permission to manipulate the selected video, wherein the selected video is manipulated into a second thumbnail such that the selected video is scaled to create the second thumbnail corresponding with a target resolution of the mosaic on the client device;
   receiving the second thumbnail displaying the selected video from the network resource;
   updating the mosaic to replace the first thumbnail displaying the first video at the first location with the second thumbnail displaying the selected video while maintaining the first thumbnail at the second location as the currently viewed thumbnail; and
   transmitting the updated mosaic to the client device for display.

2. The method of claim 1, further comprising assigning a protocol of transmitting the mosaic to the client device.

3. The method of claim 2, wherein the mosaic is transmitted to the client device as live UDP-multicast streams.

4. The method of claim 1, wherein the selected video is scaled to dimensions smaller than a macroblock.

5. The method of claim 4, further comprising arranging the selected video in the mosaic such that only the selected video occupies the second thumbnail.

6. The method of claim 4, wherein the selected video occupies a portion of the macroblock.

7. A system for providing network-based video manipulation resources to a client device, comprising:
   an application server in communication with the client device such that the client device can direct network-based video manipulation, the application server configured to:
   receive a selection of a first thumbnail from among a plurality of thumbnails to be displayed as a currently viewed thumbnail of a mosaic on the client device, wherein the first thumbnail displays a first video at a first location in the mosaic; and
   receive a request from the client device to manipulate a selected video to replace the first video displayed by the first thumbnail at the first location in the mosaic;
   a video composition module in communication with the application server, the video composition module configured to:
   define a programming guide comprising the mosaic, the mosaic including the plurality of thumbnails displayed on the client-device; and
   in response to the selection of the first thumbnail, display the first thumbnail as the currently viewed thumbnail of the mosaic at a second location in the mosaic while maintaining the display of the first thumbnail at the first location;
   a thumbnail generation module in communication with the video composition module, the thumbnail generation module configured to:
   receive the request to manipulate the selected video to replace the first video and the selected video from the application server; and
   manipulate the selected video into a second thumbnail such that the selected video is scaled to create the second thumbnail corresponding with a target resolution of the mosaic on the client device, wherein the mosaic is updated by the video composition module to replace the first thumbnail displaying the first video at the first location with the second thumbnail displaying the selected video while maintaining the first thumbnail at the second location as the currently viewed thumbnail; and a delivery mechanism module in communication with the video composition module to transmit the updated mosaic to the client device for display.

8. The system of claim 7, further comprising an access resource management module, the access resource management module communicating with the application server to assign a method of transmitting the mosaic to the client device.

9. A system of claim 8, wherein the thumbnail generation module dictates characteristics relating to the second thumbnail.

10. The system of claim 7, wherein the thumbnail generation module manipulating the selected video into the second thumbnail includes scaling the selected video to dimensions of the second thumbnail.

11. The system of claim 10, wherein the thumbnail generation module scales the selected video to dimensions smaller than a macroblock.

12. The system of claim 11, wherein the video composition module arranges the selected video in the mosaic such that only the selected video occupies the second thumbnail.

13. The system of claim 11, wherein the selected video occupies a portion of the macroblock.

14. A computer-readable storage device having computer-executable instructions stored thereon which when executed by a computer perform a method for providing network-based video manipulation resources to a client device, comprising:
 providing a programming guide comprising a mosaic, the mosaic including a plurality of thumbnails displayed on the client device, wherein each of the plurality of thumbnails displays video content at a particular location in the mosaic;
 receiving a selection of a first thumbnail from among the plurality of thumbnails, the first thumbnail displaying a first video at a first location in the mosaic;
 in response to receiving the selection of the first thumbnail, displaying the first thumbnail at a second location as a currently viewed thumbnail of the mosaic on the client device while maintaining the display of the first thumbnail at the first location;
 in response to receiving a request from the client device to manipulate a selected video to replace the first video, access a network resource having permission to manipulate the selected video, wherein the selected video is manipulated into a second thumbnail such that the selected video is scaled to create the second thumbnail at the network resource corresponding with a target resolution of the mosaic on the client device;
 receiving the second thumbnail displaying the selected video from the network resource;
 updating the mosaic to replace the first thumbnail displaying the first video at the first location with the second thumbnail displaying the selected video while maintaining the first thumbnail at the second location as the currently viewed thumbnail; and
 transmitting the updated mosaic to the client device for display.

15. The computer-readable storage device of claim 14, further comprising assigning a protocol of transmitting the mosaic to the client device.

16. The computer-readable storage device of claim 15, wherein the mosaic is transmitted to the client device as live UDP-multicast streams.

17. The computer-readable storage device of claim 14, wherein manipulating the selected video into the second thumbnail includes scaling the selected video to dimensions of the second thumbnail.

18. The computer-readable storage device of claim 17, wherein the selected video is scaled to dimensions smaller than a macroblock.

19. The computer-readable storage device of claim 18, further comprising arranging the selected video in the mosaic such that only the selected video occupies the second thumbnail.

* * * * *